(12) United States Patent
Rossi et al.

(10) Patent No.: US 8,819,633 B2
(45) Date of Patent: Aug. 26, 2014

(54) TESTING SOFTWARE APPLICATIONS WITH PROGRESS TRACKING

(75) Inventors: Riccardo Rossi, Rome (IT); Gianluca Seghetti, Pomezia (IT)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 13/429,404

(22) Filed: Mar. 25, 2012

(65) Prior Publication Data

US 2012/0185832 A1    Jul. 19, 2012

Related U.S. Application Data

(63) Continuation of application No. 12/402,227, filed on Mar. 11, 2009, now Pat. No. 8,448,144.

(30) Foreign Application Priority Data

Apr. 2, 2008    (EP) ..................................... 08153961

(51) Int. Cl.
    *G06F 9/45*    (2006.01)
(52) U.S. Cl.
    USPC ............................ 717/124; 717/130; 717/131

(58) Field of Classification Search
    None
    See application file for complete search history.

(56) References Cited

U.S. PATENT DOCUMENTS

| 6,067,639 | A | 5/2000 | Rodrigues et al. |
| 8,024,709 | B2 * | 9/2011 | Jadhav et al. ................. 717/124 |
| 2003/0192029 | A1 | 10/2003 | Hughes |
| 2008/0295079 | A1 * | 11/2008 | Yiftachel et al. .............. 717/126 |

OTHER PUBLICATIONS

USPTO Notice of Allowance & Issue Fees dated Jan. 17, 2013 for related U.S. Appl. No. 12/402,227, now issued patent No. US8,448,144.
USPTO Office Action dated Jun. 27, 2012 fo co-pending U.S. Appl. No. 12/402,227.

* cited by examiner

*Primary Examiner* — Chuck Kendall
(74) *Attorney, Agent, or Firm* — D'Ambrosio & Menon, PLLC; Usha Menon

(57) ABSTRACT

Methods for testing a software application by providing one or more test units. Each test unit is adapted to verify a feature of the software application. A weight is assigned to each test unit. A theoretical sequence of execution of the test units is determined for the assigned weights and the test units are executed for the theoretical sequence.

5 Claims, 10 Drawing Sheets

TESTING SOFTWARE APPLICATIONS WITH PROGRESS TRACKING

PRIORITY

This application is a continuation of U.S. Ser. No. 12/402,227 filed Mar. 11, 2009 which based on and claims priority from European Patent Application No. EP08153961.1 filed on Apr. 2, 2008.

BACKGROUND

Products, especially complex software applications, are generally subjected to a test process to certify the quality of the software application by verifying whether it behaves as expected. For this purpose, a suite of test scenarios, each one for verifying a specific feature of the software application, may be executed.

SUMMARY

Methods for testing a software application by providing one or more test units. Each test unit is adapted to verify a feature of the software application. A weight is assigned to each test unit. A theoretical sequence of execution of the test units is determined for the assigned weights and the test units are executed for the theoretical sequence.

The execution of the test units for the theoretical sequence further involves estimating the test units expected to fail. An expected sequence of execution of the test units is generated by adding a re-execution of each failing test unit to the theoretical sequence. An expected trend of a cumulative weight of the test units is calculated in the expected sequence. An actual trend of the cumulative weight of the executed test units is measured, and the testing progress is tracked according to a comparison between the actual trend and the expected trend.

The assignment of a weight to each test unit further comprises assigning a relevance indicator to the test unit, where the relevance indicator represents a relevance of a feature being verified by the test unit; assigning a complexity indicator to the test unit, where the complexity indicator represents a complexity of the feature being verified by the test unit; and calculating the weight according to a combination of the relevance indicator and the complexity indicator.

In one embodiment of the invention, the estimation of the failing test units comprises partitioning each sequence into one or more execution slots; calculating an expected number of the failing test units of each slot of the theoretical sequence according to an expected distribution of the failing test units based on an expected stability of the software application; and selecting the expected number of failing test units of each slot among the test units included in the slot of the theoretical sequence. A cost indicator may be assigned to each test unit, the cost indicator representing a resource consumption being required to execute the test unit, each trend plotting the cumulating weight as a function of a cumulative cost indicator of the test units in the corresponding sequence. The calculation of an expected trend includes reducing the cost indicator for each execution of each failing test unit according to a predefined reduction factor.

In one embodiment, tracking the progress of the testing further comprises monitoring a variance indicator representing a difference between the actual trend and the expected trend; and executing a recovery action in response to the reaching of a threshold by the variance indicator. In another embodiment, tracking the progress of the testing further comprises monitoring a current percentage of a current value of the cumulative weight in the actual trend with respect to a final value of the cumulative weight in the expected trend; and triggering a further testing of the software application in response to the reaching of a further threshold by the current percentage.

Implementations of the method discussed above may include a computer-implemented method. The details of one or more embodiments of the invention are set forth in the accompanying drawings and the description below. Other features of the invention will be apparent from the description and drawings, and from the claims.

DETAILED DESCRIPTION

Figure 1:
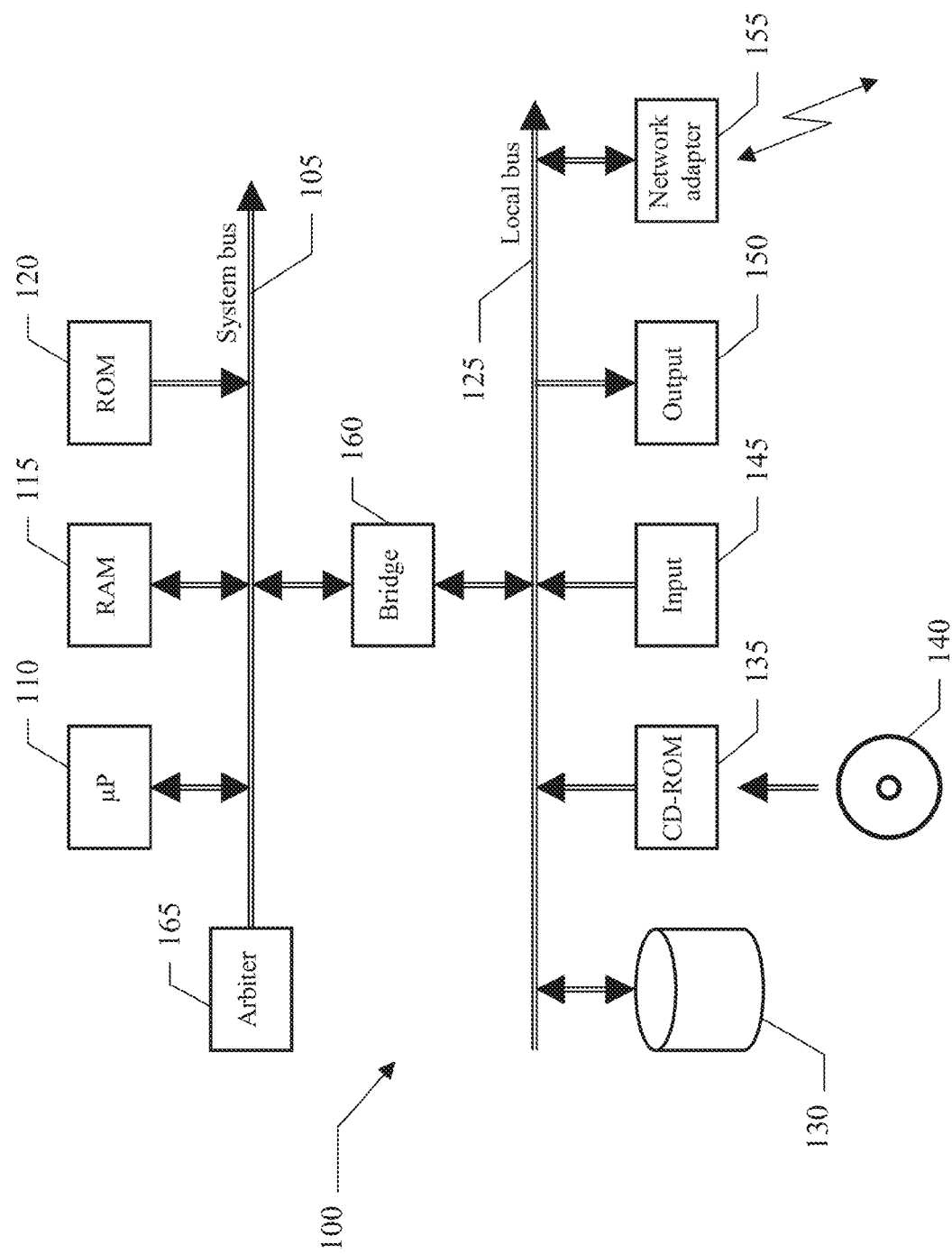
FIG. 1 is a schematic block diagram of a computer that can be used to practice an embodiment of the invention.

FIG. 1 illustrates a schematic block diagram of a computer 100. In one embodiment, the computer may be a PC. The computer 100 can be formed by several units that are connected in parallel to a system bus 105. One or more microprocessors (µP) 110 control operation of the computer 100. Further, a RAM 115 may be directly used as a working memory by the microprocessors 110. A ROM 120 stores basic code for a bootstrap of the computer 100. Several peripheral units may be clustered around a local bus 125 by means of respective interfaces. In one embodiment, a mass memory consists of one or more hard-disks 130 and drives 135 for reading DVD-ROMs 140. Also, the computer 100 includes input units 145 and output units 150. Input units may comprise a keyboard and a mouse and output units may comprise a monitor and a printer. An adapter 155 may be used to connect the computer 100 to a network (not shown). A bridge unit 160 interfaces the system bus 105 with the local bus 125. Each microprocessor 110 and the bridge unit 160 can operate as master agents requesting access to the system bus 105 for transmitting information. An arbiter 165 manages the granting of access with mutual exclusion to the system bus 105.

The computer 100 may be used to test software applications. For each software application to be tested, a suite of test scenarios may be defined. Each test scenario may verify the correct behavior of a feature of the software application by means of a set of test cases; each test case may consist of a sequence of instructions and a corresponding expected result. During a test process of the software application, each test scenario may be executed by performing the operations of its test cases. A result of the test scenario may be determined by comparing an actual result provided by the software application in each test case with the corresponding expected result. The test scenario may pass when the actual results of all its test cases match the corresponding expected results, and it may fail otherwise.

Figure 2:
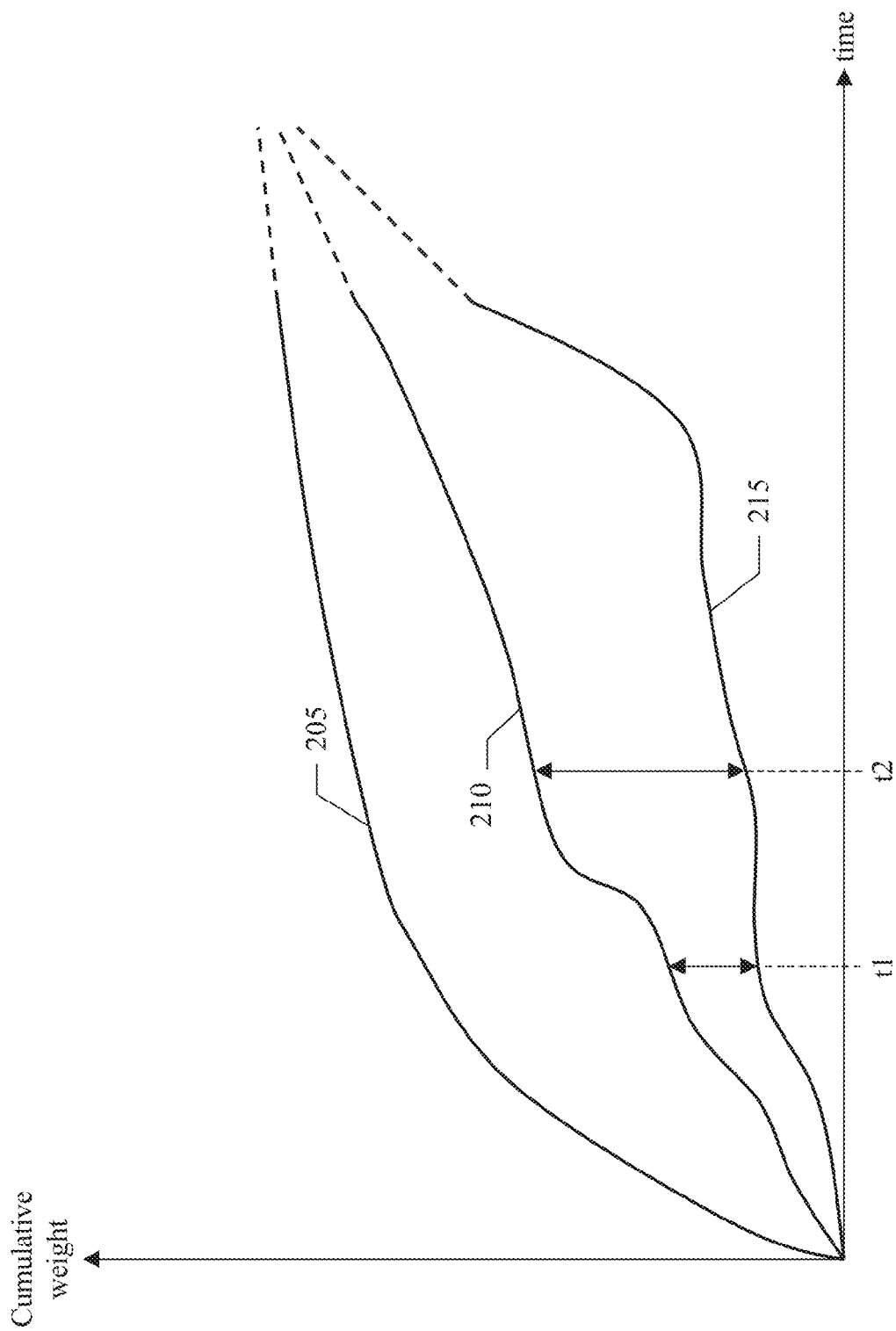
FIG. 2 provides a pictorial representation of an exemplary application of an embodiment of the invention.

FIG. 2 illustrates another embodiment of the invention. As illustrated in FIG. 2, each test scenario may be assigned a weight. In one embodiment, the weight assigned may be based on a combined priority depending on both its relevance and complexity. A theoretical sequence of execution of the test scenarios may then be determined by ordering the test scenarios according to their weight. The curve 205 may represent the theoretical trend of the cumulative weight of the test scenarios in the theoretical sequence. The curve 205 plots the cumulative weight over time of the passed test scenarios, which would be obtained in an ideal situation in which all the test scenarios pass at their first execution.

In another embodiment of the invention, the test scenarios expected to fail during the test process may be estimated. In one embodiment, the estimation may be based according to a predefined distribution law based on an expected stability of the software application. An expected sequence of execution of the test scenarios may then be generated by adding a re-execution of each failing test scenario to the theoretical sequence. In one embodiment, the expected sequence of execution may be generated according to another predefined distribution law based on an expected rate of fixing of the errors in the software application and an expected rate of re-execution of the failing test scenarios. Upon generation of the expected sequence, an expected trend of the cumulative weight of the test scenarios in the expected sequence may be calculated. FIG. 2 illustrates one embodiment of this trend with a corresponding curve 210. The curve 210 plots the cumulative weight over time of the passed test scenarios when some of the test scenarios fail. Therefore, the curve 210 may be below the curve 205, indicating a lower cumulative weight due to the missing values of the failing test scenarios.

The test scenarios are executed according to the theoretical sequence, with the re-execution of any test scenarios that failed. In one embodiment, the re-execution is performed as soon as possible. In this embodiment, re-execution may be constrained by the available resources, including but not limited to human testers. Upon execution of the actual test scenarios, an actual trend of the cumulative weight of the test scenarios may be calculated, represented by corresponding curve 215. The curve 215 plots the cumulative weight over time of the executed test scenarios that actually passed. In one embodiment, the same final value may be reached at the end of the test process once all tests pass.

In one embodiment, the expected trend curve 210, and the actual trend curve 215 are compared to track the progress of the test process. In one embodiment, when the curves 215 and 210 are in relatively close proximity to each other (such as at the time t1), it may be possible to ascertain that the test process may be proceeding substantially as planned. In another embodiment, when the curve 215 significantly differs from the curve 210 (such as at the time t2), it may be possible to ascertain that the test process may be not proceeding substantially as planned. When the test process may not be proceeding substantially as planned, the failure to proceed as planned may be because it is late.

The expected trend, taking into account the test scenarios which are anticipated to fail, may represent a reliable comparison term. As such, the quality of the test process may be improved, which may further result in the increased reliability of software applications.

Figure 3:
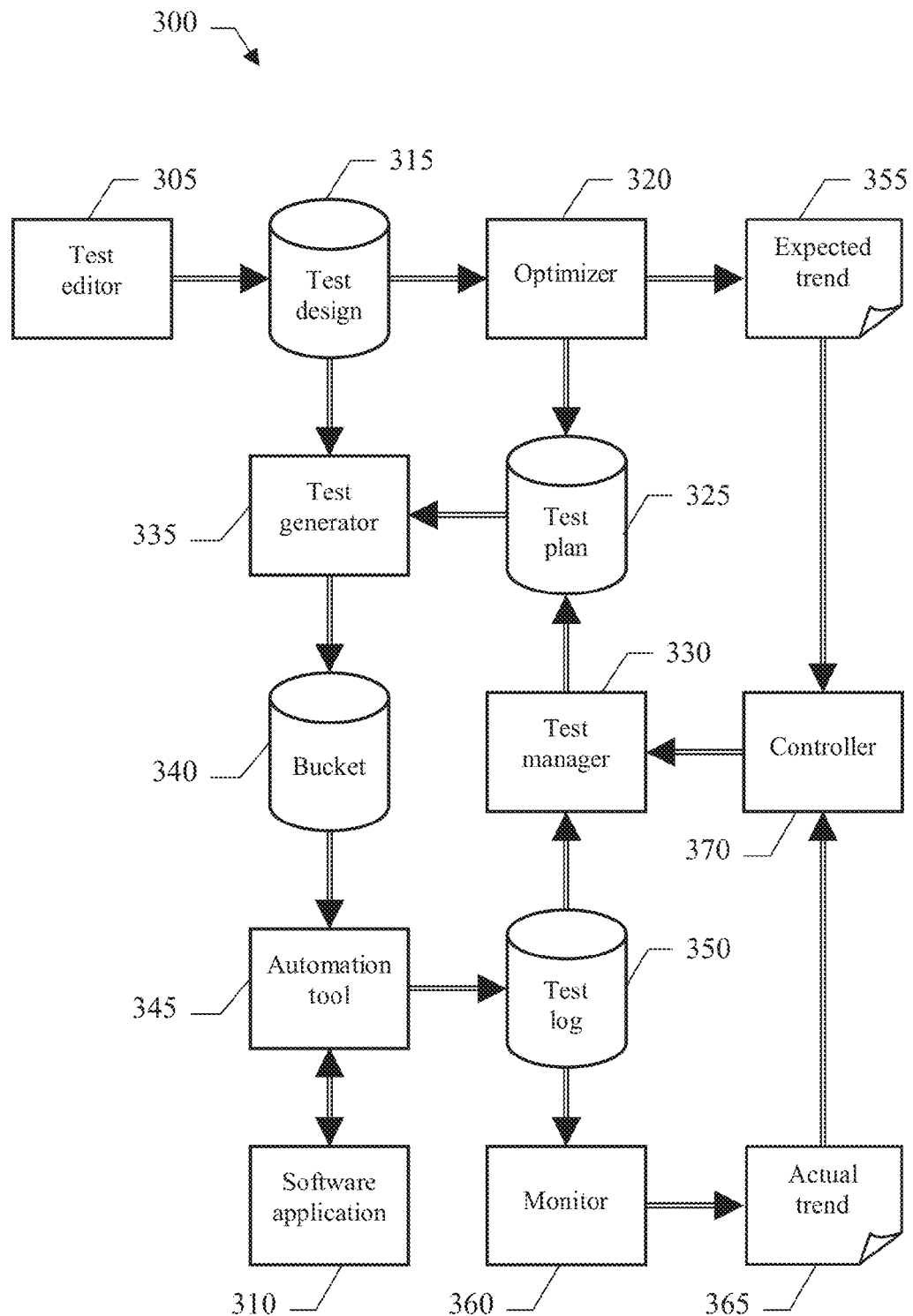
FIG. 3 shows the main software components that may be used to implement an embodiment of the invention.

FIG. 3 illustrates the main software components that may be used to implement an embodiment of the invention. The information (programs and data) may be typically stored on the hard-disk and at least partially loaded into the working memory of the computer when the programs are running. The programs are initially installed onto the hard disk. For example, the programs may be installed from DVD-ROM.

In one embodiment, the computer runs a test management suite 300. The test management suite 300 includes a test editor 305. The test editor 305 may be used to define a test design document, which specifies the test scenarios for the verification of a current software application 310. The test design document of the software application 310 may be stored into a corresponding file 315.

Each test scenario may be defined by its test cases, which may include their instructions and expected results. In one embodiment, each test scenario may be assigned a corresponding number of points. The points may represent a cost of the test scenario, in terms of resource consumption that may be required for its execution. In another embodiment, the points may be indicative of an execution time of the test scenario. The execution time may be expressed as a number of man-hours.

In an embodiment of the invention, the test scenario may be also assigned the corresponding weight. The weight may be based on a relevance indicator, which represents a relevance of the test scenario (i.e., a relevance of the feature of the software application that may be verified by the test scenario). The relevance indicator may increase with the relevance of the corresponding test scenario. The weight may be also based on a complexity indicator, which may represent the complexity of the test scenario. In one embodiment, the complexity may be based on the feature of the software application that the test scenario should verify. In one embodiment, the complexity indicator may decrease with the complexity of the corresponding test scenario. In this embodiment, the weight may be defined so that the higher the relevance indicator and/or the complexity indicator, the higher its value. Therefore, the most relevant and/or least complex scenarios will be assigned the highest weights, while the least relevant and/or most complex scenarios will be assigned the lowest weights.

As shown in FIG. 3, an optimizer 320 may access the file 315 and generate a test plan for the execution of the test scenarios. The test plan may then be stored into a corresponding file 325. The optimizer 320 may determine the theoretical sequence of execution of the test scenarios by ordering them according to the corresponding weights.

In one embodiment, the test scenarios with the highest weights are arranged at the beginning of the theoretical sequence while the test scenarios with the lowest weights are arranged at the end of the theoretical sequence. The more relevant and/or less complex scenarios may be executed before less relevant and/or more complex scenarios. In this embodiment, the late execution of the most complex test scenarios may reduce the risk of continually re-executing the test scenarios, because few errors remain in the software application. Further, this embodiment may facilitate troubleshooting, because the stability of the software application may be high. Consequently, the discovery of basic errors in the software application may be anticipated. The early execution of the most relevant test scenarios anticipates the discovery of the corresponding errors. The discovery of the errors early in the process may enable omitting test scenarios of lesser relevance later in the process.

A test manager 330 may control the test plan in the file 325 by scheduling the actual execution of the test scenarios in the order defined by the theoretical sequence according to the available resources. A test generator 335 may create an execution bucket for each test scenario as defined in the file 315 to be executed as defined in the file 325. In one embodiment, the bucket specifies the operations to be performed for running the relevant test cases in a machine-readable language. For example, the machine-readable language may be XML-based. The bucket so obtained may be saved into a corresponding file 340. An automation tool 345 may control the execution of each bucket read from the file 340 on the software application 310. In one embodiment, the automation tool may consist of the STAF/STAX, which is formed by the STAX execution engine running on top of the STAF framework). The automation tool 345 may save the outcome of each test scenario onto a test log 350. The test manager 330 may update the test plan in the file 325 according to the outcomes of the executed test scenarios in the test log 350. Each failed test scenario may be reported to a development team of the software application for fixing the corresponding errors. Once the errors have been fixed, a re-execution of the same test scenario may be added to the test plan.

The optimizer 320 may also generate the expected sequence of execution of the test scenarios. This may be accomplished by adding the re-execution of the test cases that are expected to fail. The optimizer 320 may then calculate the expected trend of the cumulative weight of the test scenarios in the expected sequence. The expected trend may be saved into a corresponding table 355. A monitor 360 may measure the actual trend of the cumulative weight of the executed test scenarios which passed. The executed test scenarios which passed are indicated in the test log 350. The actual trend may be stored into another table 365. A controller 370 accesses both the table 355 (with the expected trend) and the table 365 (with the actual trend). The controller 370 may track the progress of the test process by comparing the actual trend with the expected trend. The controller 370 may further instruct the test manager 330 according to the result of the tracking, so as to cause it to update the test plan in the file 325 when the test process is not proceeding as planned. This update of the test plan may be performed in an attempt to restore its correct progress.

Figure 4A:
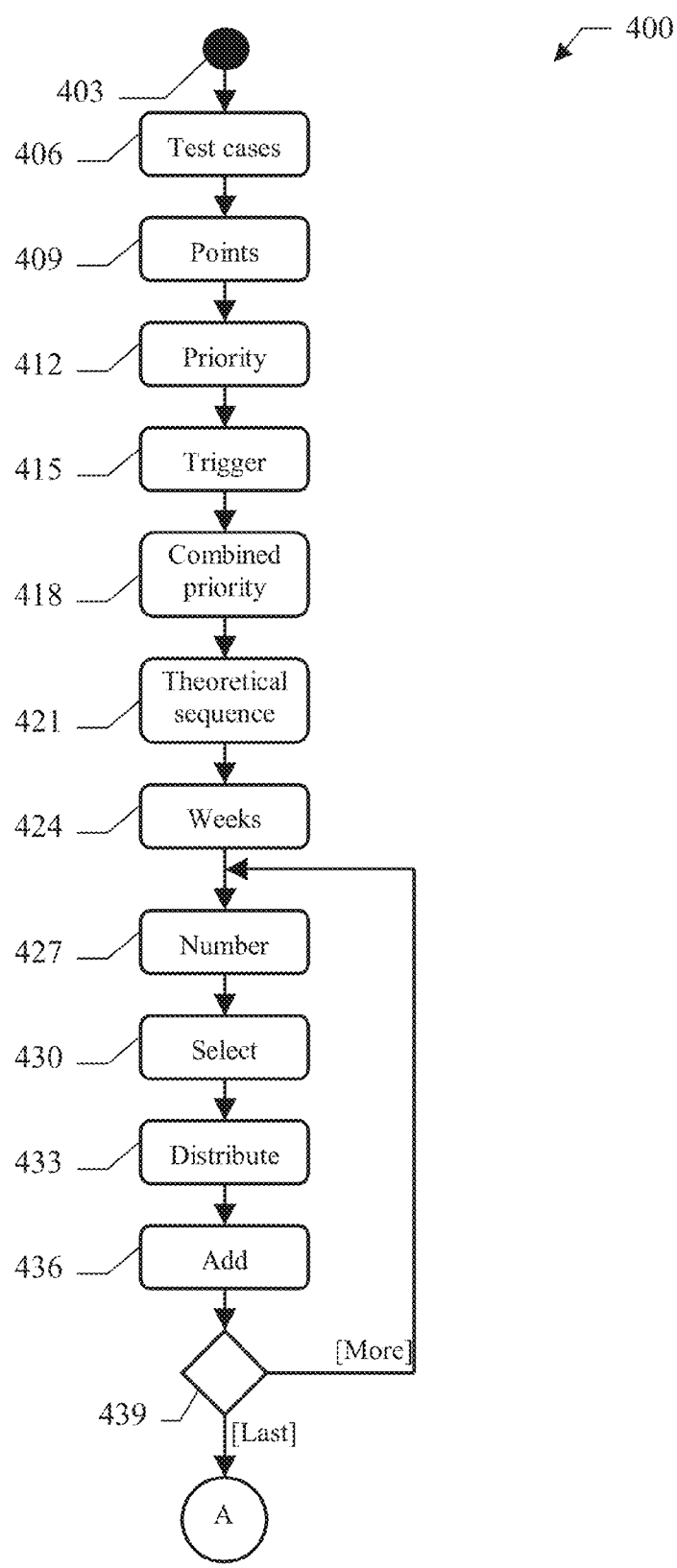
FIGS. 4A-4B illustrate a diagram describing the flow of activities relating to an implementation of an embodiment of the invention.
Figure 4B:
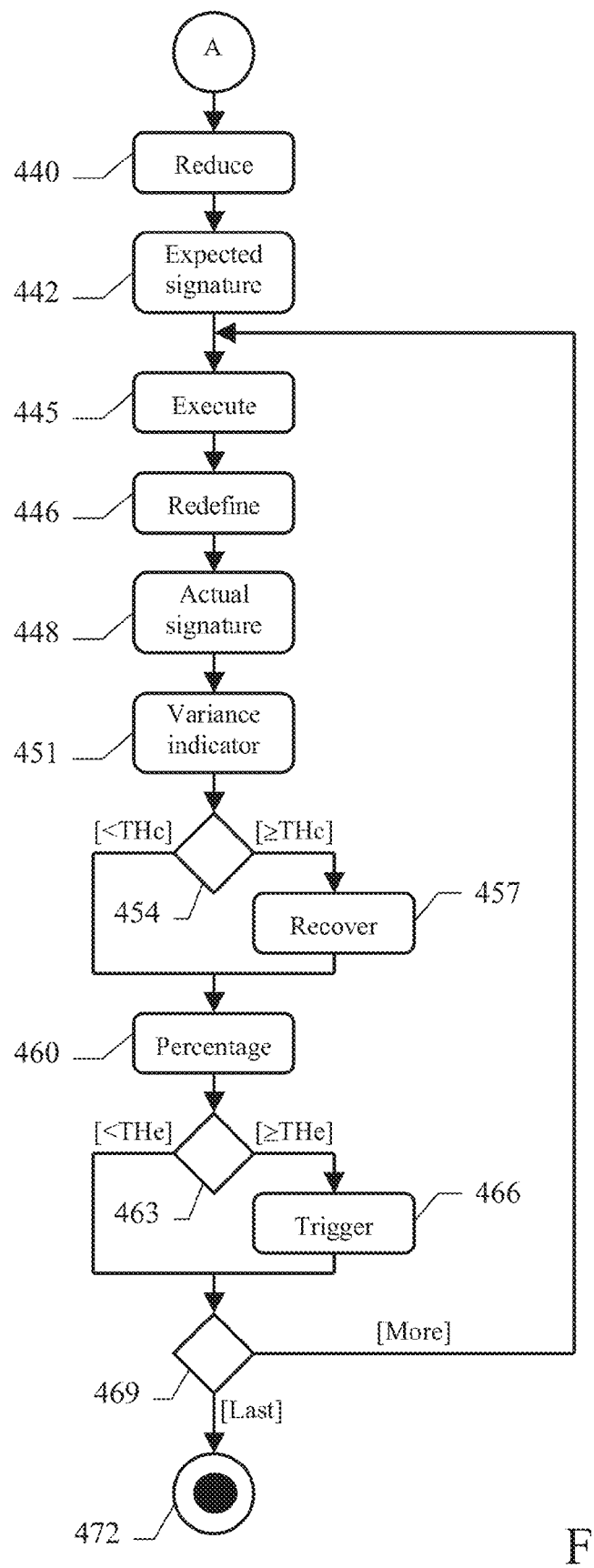

FIGS. 4A and 4B illustrate one embodiment of the invention in which the logic flow of an exemplary process can be implemented in the above-described system with a method 400. In one embodiment, a software application may be represented.

In this embodiment, the method may begin at the start block 403 and pass to block 406. In another embodiment, the test scenarios, required to test software applications, may be defined by specifying their test cases, including their instructions and expected results.

The block 409 represents the potential assignment of each test scenario the corresponding points. In one embodiment, the corresponding points may be based on the number of man-hours required for the execution of the test scenario. In this or another embodiment, the time required to execute the test scenario may be estimated according to its complexity.

With reference now to block 412, each test scenario may be assigned the corresponding relevance indicator. For this purpose, it may be possible to use a classic priority of the test scenario in which the higher the priority correlates to the higher the relevance of the test scenario. In one embodiment, the priority may take the values High (such as 100), Medium (such as 50), and Low (such as 0).

Moving to block 415, each test scenario may be also assigned the corresponding complexity indicator. In one embodiment, it may be possible to use a trigger as defined in the Orthogonal Defect Classification (ODC) specification with the higher the trigger the lower the complexity of the test scenario. The ODC is a technique that may be used to convert information relating to errors discovered in software applications into valuable measurements of their development. In one embodiment, the trigger indicates the conditions that allow any errors to manifest. For example, the trigger may receive the values Coverage (such as 100), Variation (such as 75), Interaction (such as 50), Sequencing (such as 25) and Other (such as 0). Coverage may comprise the usage of a single function with a single parameter, Variation may comprise the usage of a single function with multiple parameters, and Sequencing may comprise the usage of multiple functions in a specific order and Others may comprise any further values of the trigger.

The method then descends into block 418, wherein the weight of each test scenario may be calculated in the form of its combined priority. For example, the combined priority may be defined as a weighted sum of the priority and the trigger:

$$CP = C_p \cdot P + C_t \cdot T$$

where CP is the combined priority, P is the priority, $C_p$ is a weighting coefficient for the priority P; T is the trigger, and $C_t$ is a weighting coefficient for the trigger T. If the priority P and the trigger T have been normalized in the same range of values (for example, from 0 to 100), the priority coefficient $C_p$ may be preferably higher than the trigger coefficient $C_t$ (for example, $C_p = 2\text{-}10 C_t$). Therefore, the contribution of the priority P prevails with respect to the contribution of the trigger T in the definition of the combined priority CP (so as to take into account the higher importance of the relevance of the test scenario with respect to its complexity).

Moving to block 421, the theoretical sequence of execution of the test scenarios may be determined. For this purpose, a sorting parameter SP is calculated for each test scenario as the ratio between its combined priority CP and points NP:

$$SP = \frac{CP}{NP},$$

The test scenarios may then be arranged in decreasing order of the sorting parameter SP. When multiples test scenarios have the same sorting parameter SP, they may be arranged in decreasing order of the combined priority CP. In another embodiment, when multiple scenarios also have the same combined priority CP, they may be arranged in decreasing order of the priority P and then in decreasing order of the trigger T. Here, it may be possible to have the execution of the test scenarios that are more relevant and/or less complex (i.e., higher combined priority CP) and that are shorter (i.e., lower points NP) at the beginning of the test process. Also, it may be possible to arrange the test scenarios under the same conditions that are more relevant (i.e., higher priority P) before the scenarios that are less complex (i.e., higher trigger T).

With reference now to block 424, the theoretical sequence may be partitioned into weeks of execution of the test scenarios. In this embodiment, each week may be defined by a corresponding number of total points of the test scenarios that can be executed during the week, taking into account available resources.

A loop may then be performed for each week of the theoretical sequence. The loop may begin at block 427, wherein a number of the failing test scenarios that are expected to fail in the current week may be calculated. For this purpose, it may be assumed that the failing test scenarios are distributed along the test process according to a decreasing exponential law:

$$NF_w = (1 - CL) \cdot N \cdot e^{-w/TW-1 \cdot CL}$$

wherein TW−1 is the total number of weeks of the test process, w is the current week (from 0 to TW−1), $NF_w$ is the number of failing test scenarios in the w-th week, and CL is a parameter representing an expected confidence level of the software application. In one embodiment, the confidence level CL may express an initial stability of the software application in percentage (from 0 to 1), with the higher the confidence level CL the higher the stability (from CL=0 when the software application may be completely incorrect to CL=1 when the software application may be completely correct).

Figure 5:
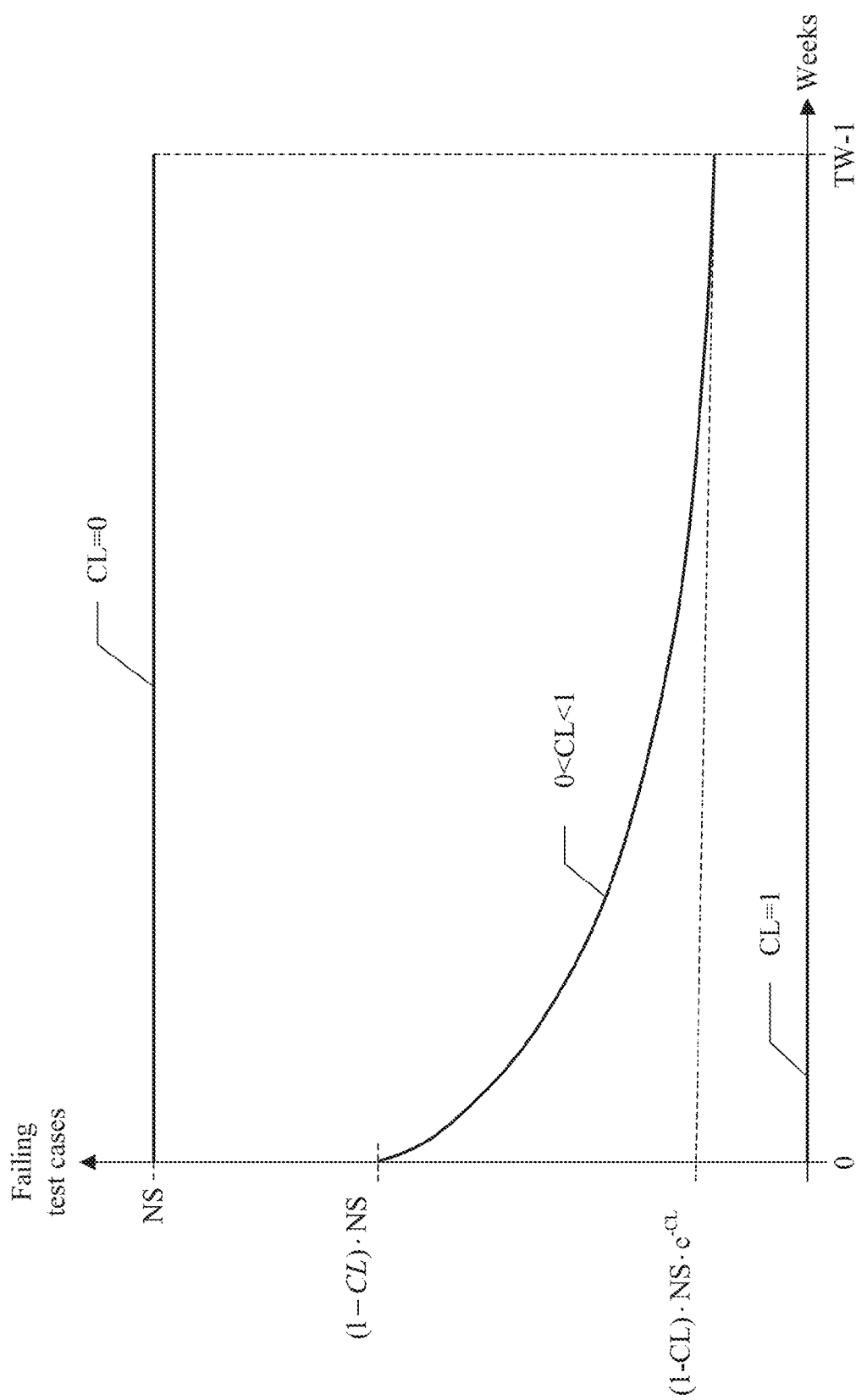
FIGS. 5-6 show curves representing exemplary distribution laws that may be used to implement an embodiment of the invention.

FIG. 5 illustrates the limit condition in which CL=0. In one embodiment, $NF_w$=NS because all the test scenarios may fail. In another embodiment, the limit condition in which CL=1 may always be $NF_w$=0 because no test scenarios fail. In other embodiments (0<CL<1), the number of failing test scenarios $NF_w$ decreases exponentially from $NF_w=(1-CL) \cdot NS$ (at the first week w=0) to $NF_w=(1-CL) \cdot NS \cdot e^{-w}$ (at the last week w=TW−1).

Referring again to FIGS. 4A and 4B, block 430 may represent the failing test scenarios of the current week selected (in the above-calculated number $NF_w$) among all the test scenarios thereof. In one embodiment, the failing test scenarios may be selected according to a pseudo-random algorithm, which assigns a probability to each test scenario depending on its combined priority CP. In another embodiment, the higher the priority P and the lower the trigger T, the higher the probability of the test scenario to be selected. This takes into account the fact that the test scenarios that are more likely to fail are the ones that are executed before when the software application is less stable (high priority P) and/or that are more complex (low trigger T).

The method may continue to block 433, wherein the selected failing test scenarios of the current week are distributed throughout the next weeks of the test process. For this purpose, there may be applied a linear decreasing distribution law:

$$ND_i = TR \cdot FR \cdot NF_w \cdot \frac{TR \cdot FR \cdot i - 2}{TR \cdot FR - 2},$$

wherein i is the next week following the w-th current week (from 1 to TW−1−w), $ND_i$ is the number of failing test scenarios that are distributed to the i-th next week, FR is a parameter representing an expected rate of fixing of the errors in the software application, and TR is another parameter representing an expected rate of re-execution of the failing test scenarios. In one embodiment, the fixing rate FR expresses the capacity in percentage (from 0 to 1) to fix the errors that block the execution of the failed test scenarios, with the higher the fixing rate FR the higher this capacity (from FR=0 when no error is fixed until the end of the test process to FR=1 when all the errors are fixed immediately in the same week in which they are discovered). The testing rate TR may express the capacity in percentage (from 0 to 1) to re-execute the failing test scenarios once their errors have been fixed, with the higher the testing rate TR the higher this capacity (from TR=0 when no failing test scenario can be re-executed until the end of the test process to TR=1 when all the failing test scenarios can be re-executed immediately in the next week after their errors have been fixed).

Figure 6:
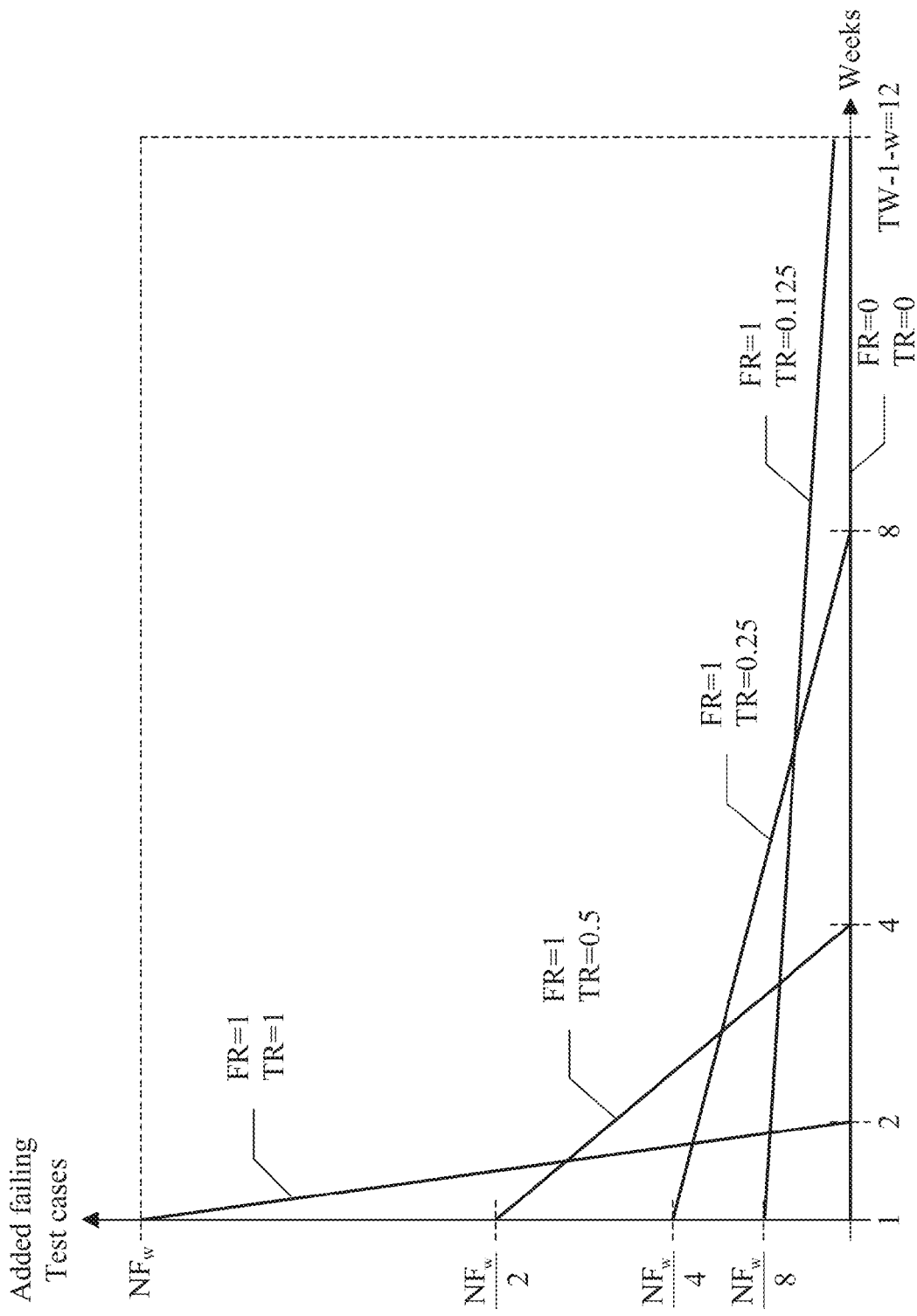

As shown in FIG. 6, in the limit condition in which FR=1, TF=1, the distributed failing test scenarios start from $ND_i=NF_w$ (at the first next week i=1) and become zero at the second next week i=2 because all the failing test scenarios are fixed at the current week and re-executed at the first next week. On the other hand, when the fixing rate FR and/or the testing rate TR decrease, the distributed failing test scenarios start from a lower value $ND_1 = TR \cdot FR \cdot NF_w$ (at the first next week i=1) and become zero later on when $$i = \frac{2}{TR \cdot FR}$$

(or they reach the last week i=TW−1−w beforehand). In one embodiment, as shown in FIG. 6, when FR=1, TR=0.5 the distributed failing test scenarios start from $$ND_1 = \frac{NF_w}{2}$$

and become zero for i=4, while when FR=1, TR=0.25 the distributed failing test scenarios start from $$ND_1 = \frac{NF_w}{4}$$

and become zero for i=8. Also, assuming that the last week is TW−1−w=12, when FR=1, TR=0.125, the distributed failing test scenarios start from $$ND_1 = \frac{NF_w}{8}$$

and become ND=0.9·$NF_w$ at the last week i=12. In the opposed limit condition in which FR=0 and/or TF=0, the distributed failing test scenarios are always zero, because no errors are fixed and/or no failing test scenario can be re-executed until the end of the test process.

In one embodiment, the distribution of the failing test scenarios throughout the next weeks may be then performed by applying the following algorithm. Particularly, the distributed failing test scenarios $ND_i$ are calculated for each i-th next week (1≤i≤TW−1−w) by applying the above-mentioned formula, with the value so obtained that may be truncated to the lower integer and it is set to zero when it becomes negative:

$$ND_i = int\left[ TR \cdot FR \cdot NF_w \cdot \frac{TR \cdot FR \cdot i - 2}{TR \cdot FR - 2} \right]$$

for $TR \cdot FR \cdot NF_w \cdot \frac{TR \cdot FR \cdot i - 2}{TR \cdot FR - 2} > 0$, and $ND_i = 0$ otherwise A number of the residual failing test scenarios $NR_w$ may then be calculated as the difference between the number of failing test scenarios $NF_w$ and the sum of the distributed failing test scenarios $ND_i$ in all the next weeks:

$$NR_w = NF_w - \sum_{i=1}^{TW-1-w} ND_i.$$

The number of the residual failing test scenarios $NR_w$ may then be added to the distributed failing test scenarios $ND_u$ of the last next week (i=u) having this value higher than zero:

$$ND_u = ND_u + NR_w$$

For example, let us assume that $NF_w=100$ failing test scenarios are to be distributed throughout $TW-1-w=10$ next weeks by applying a distribution law with a fixing rate $FR=0.9$ and a testing rate $TR=0.3$; in this case, the distributed failing test scenarios $ND_i$ for each next week are:

$ND_1=27.000 \otimes 27$,
$ND_2=22.786 \otimes 22$,
$ND_3=18.572 \otimes 18$,
$ND_4=14.358 \otimes 14$,
$ND_5=10.145 \otimes 10$,
$ND_6=5.931 \otimes 5$,
$ND_7=1.717 \otimes 1$,
$ND_8=-2.497 \otimes 0$,
$ND_9=0$,
$ND_{10}=0$.

The number of residual failing test scenarios $NR_w$ is then:

$NR_w=100-(27+22+18+14+10+5+1)=3$.

Therefore, the distributed failing test scenarios $ND_7$ of the last next week having this value higher than zero become:

$ND_7=1+3=4$.

Referring again to FIGS. 4A and 4B at block 436, the failing test scenarios of the current week to be distributed in each i-th next week may be selected (in the above-calculated number $ND_i$) by scanning their list. In one embodiment, the list may be scanned according to the corresponding selection order. The theoretical sequence may be then be updated by adding a re-execution of the selected failing test scenarios to the corresponding next week. The selected failing test scenarios may be re-executed after the other test scenarios thereof.

A test may be made at block 439 to verify whether the last week of the test process (w=TW-1) has been processed. In this embodiment, the method may return to block 427 to repeat the same operations described above for another week if the rest process has not been processed. Conversely, the loop is exited by descending into block 440.

The updates carried out as described above on the theoretical sequence may generate the desired expected sequence of execution of the test scenarios. The points of each failing test scenario (included in the expected sequence twice) may then be reduced by a predefined factor. For example, the points of the failing test scenario may be split equally between its first execution (50%) and its re-execution (50%). Thus, each execution of the failing test scenario may be shorter.

Continuing to block 442, the expected trend may be calculated. In one embodiment, the expected trend may be defined by plotting the cumulative combined priority of the test scenarios in the expected sequence against their cumulative points until a final value of the cumulative combined priority of all the test scenarios can be reached for the final value of their cumulative points.

A further loop may then be executed at each week of the test process. In one embodiment, this loop begins at the first week. The loop may begin at block 445, wherein the test scenarios of the current week are executed. With reference now to block 446, at the end of the week the test plan may be redefined. In one embodiment, a re-execution of the failed test scenarios whose errors have been fixed may be added to the test plan. In this embodiment, the test cases that failed during the week may be reported to the development team for fixing the corresponding errors in the software application.

Passing on to block 448 the actual trend may be calculated. For this purpose, the cumulative combined priority of the executed test scenarios that actually passed may be plotted against their cumulative points (reaching the same final value of the cumulative combined priority for the same final value of the combined points).

A variance indicator $VI(np')$ may then be calculated at block 451 for a current value of the cumulative points $np'$ of the executed test scenarios. The variance indicator $VI(np')$ represents a current difference between an integration of the actual trend and an integration of the expected trend in percentage (from 0 to 1). More specifically, the variance indicator is calculated as:

$$VI(np') = 1 - \frac{\bigoplus_{np=0}^{np'} CP_a(np)}{\bigoplus_{np=0}^{np'} CP_e(np)},$$

wherein np are the cumulative points, $CP_a(np)$ and $CP_e(np)$ are the cumulative combined priority in the actual trend and in the expected trend, respectively (as a function of the cumulative points np). Therefore, the variance indicator $VI(np')=0$ when the actual trend $CP_a(np)$ is the same as the expected trend $CP_e(np)$. As the actual trend $CP_a(np)$ differs from the expected trend $CP_e(np)$, the variance indicator $VI(np')$ increases, assuming that the actual trend $CP_a(np)$ is always lower than the expected trend $CP_e(np)$ towards the limit value $VI(np')=1$.

Continuing on to block 454, the variance indicator $VI(np')$ is compared with a threshold THc (for example, THc=0.7-0.9). When the variance indicator $VI(np')$ reaches the threshold THc ($VI(np') \mu THc$), the test process may be deemed not proceeding as planned. In one embodiment, suitable recovery actions may be taken at block 457 in an attempt to recover its planned progress. In another embodiment, it may be possible to simplify the execution of the remaining test scenarios, to allocate more resources to the test process, or to cut some of the remaining test scenarios. The method then descends into block 460. The same point may also be reached directly from block 454 when the variance indicator $VI(np')$ is lower than the threshold THc ($VI(np')<THc$), meaning that the test process is proceeding as planned.

In one embodiment, a twofold tracking of the test process may be performed. For example, a standard comparison between a current value of the cumulative points of the executed test scenarios that passed and an expected value thereof at the same time may provide a quantitative tracking of the test process (with reference to the passing of the planned amount of test scenarios over time). It may be possible to determine when the test process is not on schedule, e.g. it may be late. On the other hand, the above-described comparison between the actual trend of the cumulative combined priority over the cumulative points and the expected trend thereof provides a qualitative tracking of the test process (with respect to the planned relevance and complexity of the passed test scenarios). It may be possible to determine any problems that prevent the execution of the test scenarios in the correct order. For example, this may be due to an excessive number of errors in the software application, or to a lack of specific resources, including but not limited to skilled testers for the most complex test scenarios.

With reference now to block 460, there may be calculated a percentage $CP_a\%(np')$ of a current value of the cumulative combined priority for the current value of the cumulative points $np'$ ($CP_a(np')$) with respect to its final value in the expected trend ($CP_e(np_e)$):

$$CP_a\%(np') = \frac{CP_a(np')}{CP_e(np_e)}$$

The method then continues to block 463, wherein the percentage $CP_a\%$ (np') is compared with a further threshold THp (for example, THp=0.7-0.9). When the percentage $CP_a\%$ (np') reaches the threshold THp ($CP_a\%$ (np')μTHp), a next phase of the test process is triggered at block 466; for example, a current phase of the test process may be a Component Verification Test, or CVT (wherein the software application is verified at the level of its components), and the next phase thereof may be a System Verification Test, or SVT (wherein the software application is verified as a whole). The proposed embodiment defines a exit criterion for triggering the starting of the next phase of the test process concurrently with the previous phase thereof. This may allow starting the next phase of the test process even when a few test scenarios continue to fail.

The method then descends into block 469; the same point may also be reached directly from block 463 when the percentage $CP_a\%$ (np') is lower than the threshold THp ($CP_a\%$ (np')<THp), because the next phase of the test process cannot be started yet.

At this point, a test may be made to verify whether the test process has been completed. In an embodiment wherein the test has not been completed, the method may return to block 445 to repeat the same operations described above at a next week of the test plan. In another embodiment, the process ends at the concentric white/block stop circles 472.

Example 1

Figure 7:
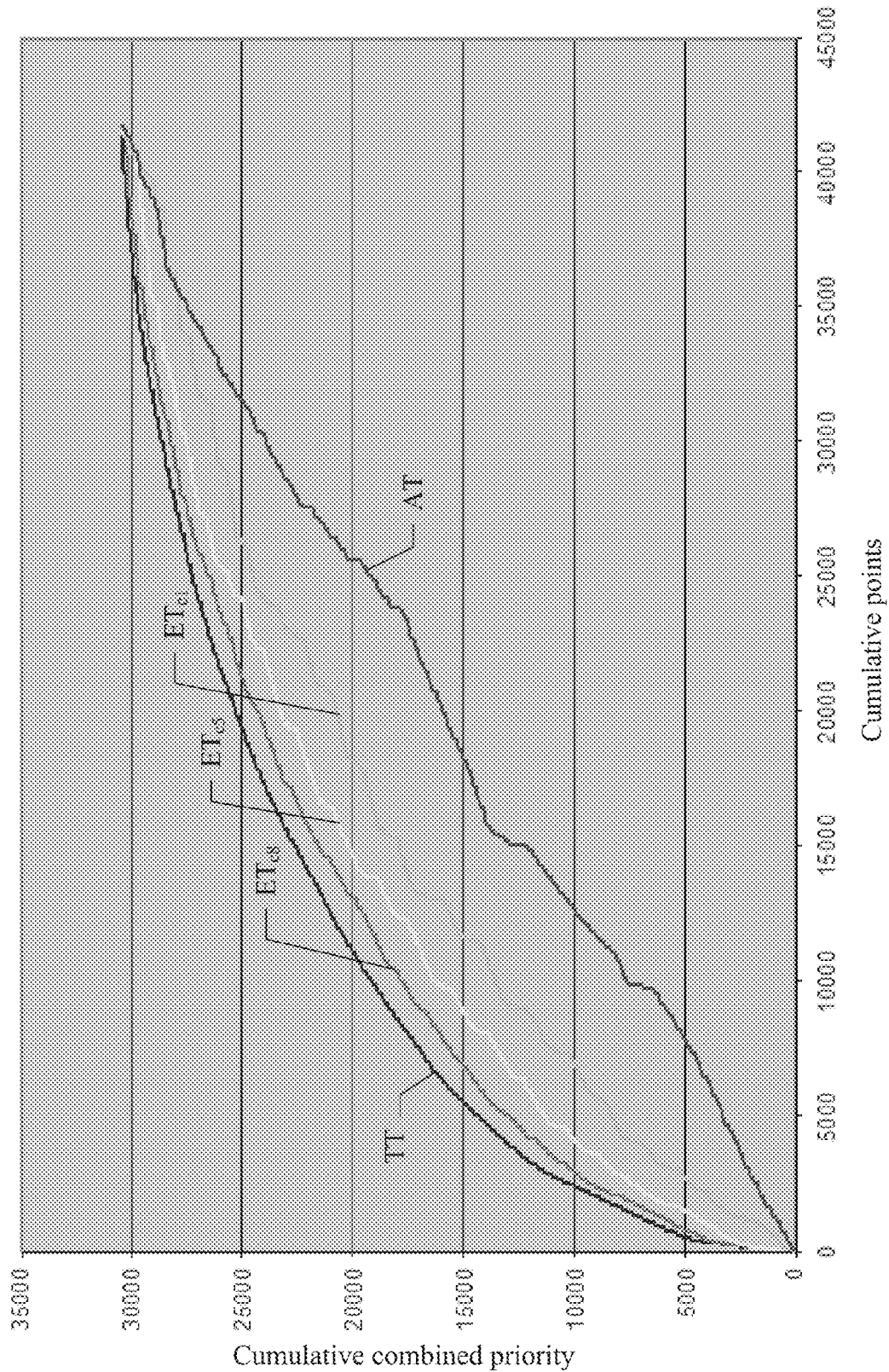
FIGS. 7-9 illustrate exemplary results of application of an embodiment of the invention.

An exemplary result of application of the solution according to an embodiment of the invention is illustrated in FIG. 7. Particularly, a curve TT represents the theoretical trend of a sample test process—plotting the cumulative combined priority (from 0 to 30,100) against the cumulative points (from 0 to 42,000). The curve AT represents the actual trend that has been obtained from a real execution of the test process. Three curves $ET_{c8}$, $ET_{c5}$ and $ET_{c1}$ represent the expected trend that are calculated (with the fixing rate FR=0.5 and the testing rate TR=0.5) for different confidence levels CL=0.8, CL=0.5 and CL=0.1, respectively. As can be seen, the expected trends of the curves $ET_{c8}$, $ET_{c5}$ and $ET_{c1}$ (and especially the expected trend of the curve $ET_{c1}$ for the lowest confidence level CL=0.1) are far more accurate in representing the actual trend of the curve AT than the theoretical curve TT does.

Example 2

Figure 8:
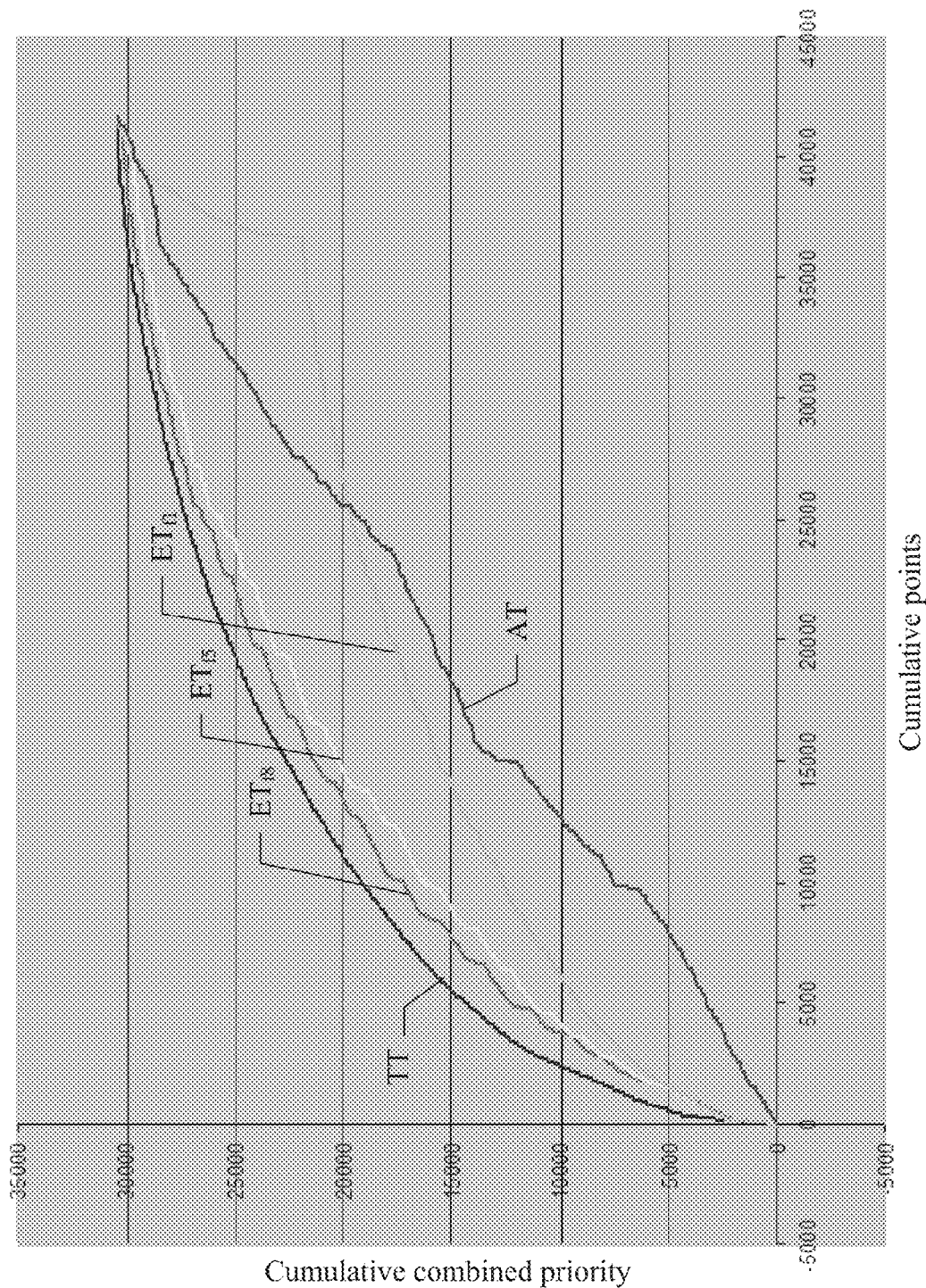

Another exemplary result of application of the solution according to an embodiment of the invention is illustrated in FIG. 8. This example involves the same curve TT of the theoretical trend and the same curve AT of the actual trend. Here, three curves $ET_{f8}$, $ET_{f5}$ and $ET_{f1}$ represent the expected trend that are calculated (with the confidence level CL=0.5 and the testing rate TR=0.5) for different fixing rates FR=0.8, FR=0.5 and FR=0.1, respectively. As above, the expected trends of the curves $ET_{c8}$, $ET_{c5}$ and $ET_{c1}$ (and especially the expected trend of the curve $ET_{f5}$ for the intermediate fixing rate FR=0.5) are far more accurate in tracking the actual trend of the curve AT.

Example 3

Figure 9:
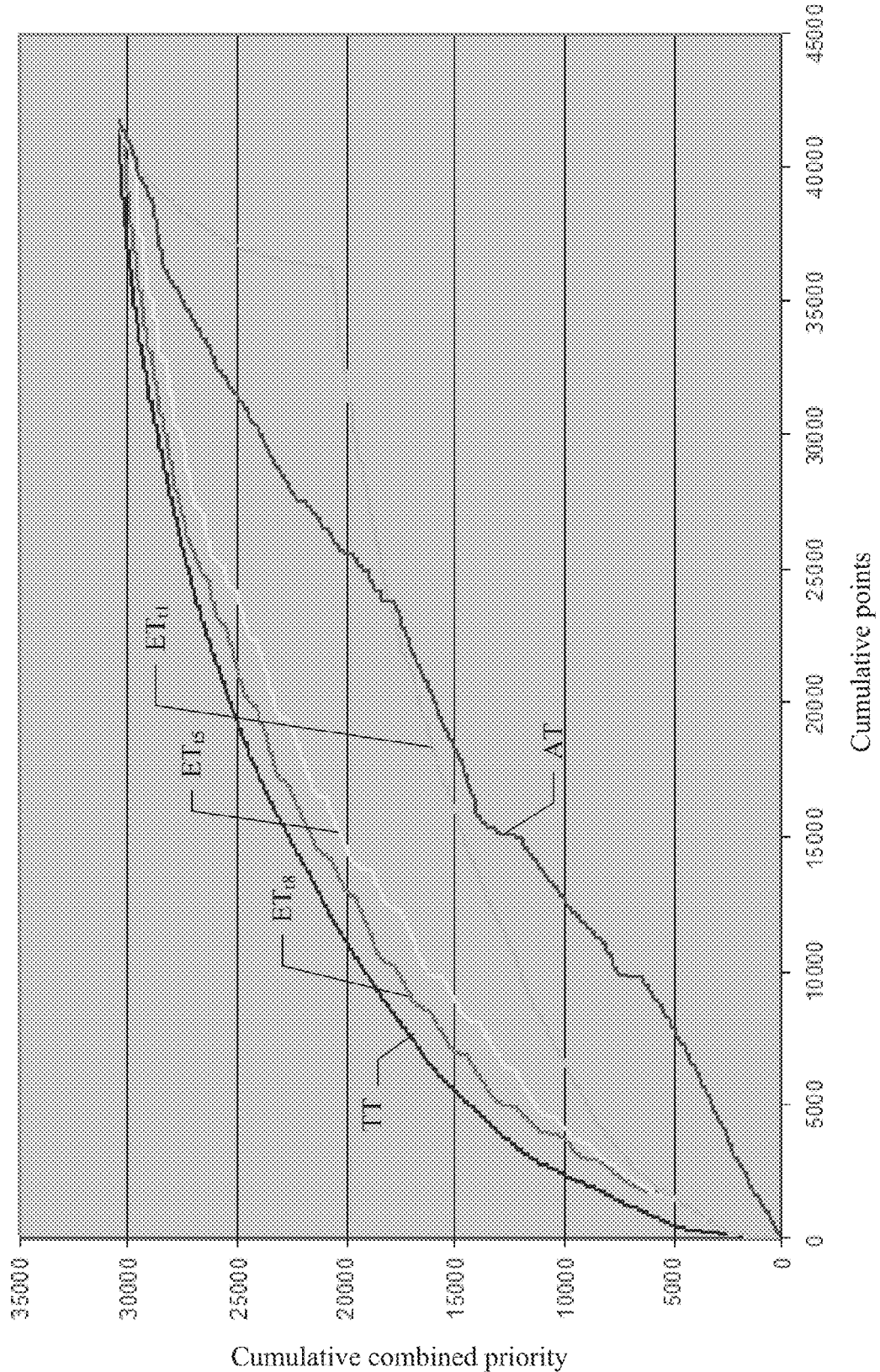

A further exemplary result of application of the solution according to an embodiment of the invention is illustrated in FIG. 9. This example again involves the same curve TT of the theoretical trend and the same curve AT of the actual trend. Here, three curves $ET_{t8}$, $ET_{t5}$ and $ET_{t1}$ represent the expected trend that are calculated (with the confidence level CL=0.5 and the fixing rate FR=0.5) for different testing rates TR=0.8, TR=0.5 and TR=0.1, respectively. The expected trends of the curves $ET_{t8}$, $ET_{t5}$ and $ET_{t1}$ (and especially the expected trend of the curve $ET_{t5}$ for the intermediate testing rate TR=0.5) are again far more accurate in tracking the actual trend of the curve AT.

For example, the embodiments of the invention may be implemented with an equivalent method (by using similar steps, removing some steps being non-essential, or adding further optional steps). Also, the steps may be performed in part or in whole in a different order, concurrently or in an interleaved way.

Similar considerations may apply if the embodiments of the invention are applied to different test processes for any software application. For example, the test process may be executed on Command Line Interfaces (CLIs), on Graphical User Interfaces (GUIs), on distributed software applications, etc. Each bucket may also be generated in a different language for use by any other automation tool (even if the execution of the test scenarios in a manual way is not excluded). Also, nothing prevents the application of the same solution to the test of other products, including integrated circuits, computers, etc. Further, the test scenarios may be replaced with complex stories covering multiple test operations, or with any other test units defining basic activities that concur to the definition of the whole test process. Alternatively, the actual execution of the test scenarios may be determined in another way. For example, the execution may be determined by taking into account possible dependencies of the test scenarios from the passing of other test scenarios, or any other execution constraints.

In an embodiment of the invention, it may be possible to use different values of the priority (for example, in a continuous range), or any equivalent indicator of the relevance of the test scenario. Likewise, it may be possible to use other values of the trigger, including but not limited to backward compatibility, congruency, workload stress, and so on, or any equivalent indicator of the complexity of the test scenario. Further, the combined priority may be obtained by combining the priority and the trigger in a different way (for example, by using other weighting coefficients, or nonlinear formulas). Also, it is possible to assign any other weight to the test scenarios for ordering them in the theoretical sequence (even depending on a single characteristic of the test scenarios). Examples of alternative weights are based on the type of features that are verified by the test scenarios, on the urgency of their execution, on the severity of the corresponding errors, and the like.

The possibility of estimating the failing test scenarios in another way is not excluded. For example, the theoretical sequence may be partitioned into weeks by simply assigning a fixed number of test scenarios to each one of them. Also, similar considerations apply to any other (shorter or longer) execution slot, including but not limited to days, fortnights, and the like. Also, the number of failing test scenarios may be calculated according to a distribution law of a different type (for example, a hyperbolic one), and/or based on equivalent parameters (for example, indicative of the complexity of the software application). Nothing prevents performing the same operations continuously along the theoretical sequence without any partitioning thereof.

In an alternative implementation, the failing test scenarios of each week are selected with another algorithm. For example, the selection may be random.

Also, it may be possible to distribute the failing test scenarios into the next weeks in another way. Non-limiting examples of this include using an exponential law or uniformly.

Similar considerations apply if the points of each test scenario are calculated in a different way. For example, the calculation may be automatically according to the number of their test cases. Also, the points may be replaced with an equivalent cost indicator (for example, based on monetary expenses for executing the test scenarios). The points of the failing test scenarios may further be reduced in another way for their multiple executions (even with a sum different from 100%). The expected and actual trends may be expressed in whatever form (for example, by plotting the cumulative combined priority against the time).

The above-described variance indicator is merely illustrative, and it must not be interpreted in a limitative manner. For example, the progress of the test process may be tracked by comparing the current values of the actual trend and of the expected trend, by calculating their running average, and so on. Likewise, any other recovery action (including the simple delay of the delivery of the software application) may be taken when the variance indicator reaches the corresponding threshold, or any equivalent critical condition is detected according to a comparison between the actual trend and the expected trend. However, nothing prevents exploiting the proposed solution to conduct a retrospective analysis of the test process after its conclusion.

Alternatively, whatever phase of the test process (for example, relating to its design, implementation, documentation, and so on) may be triggered when the percentage of the current value of the cumulative combined priority in the actual trend reaches any threshold (even depending on the type of the next phase of the test process). This feature is not strictly necessary, and it may be omitted in a specific implementation of the invention.

The proposed solution may be implemented as a stand-alone module, as a plug-in for the test management suite, or even directly in the test management suite itself. It would be readily apparent that it is also possible to deploy the same solution as a service that is accessed through a network, including but not limited to the Internet.

Similar considerations apply if the computer program instructions which may be used to implement an embodiment of the invention are structured in a different way, or if additional modules or functions are provided. Also, the memory structures may be of other types, or may be replaced with equivalent entities (not necessarily consisting of physical storage media). The computer program instructions may take any form suitable to be used by any data processing system or in connection therewith (for example, within a virtual machine). Also, the program instructions may be in the form of external or resident software, firmware, or microcode (either in object code or in source code—for example, to be compiled or interpreted). Furthermore, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of this medium are fixed disks (where the program can be pre-loaded), removable disks, tapes, cards, wires, fibers, wireless connections, networks, broadcast waves, and the like. In any case, the solution according to an embodiment of the present invention lends itself to be implemented even with a hardware structure (for example, integrated in a chip of semiconductor material), or with a combination of software and hardware.

The proposed method may also be carried out on a system with distributed architecture, including but not limited to being based on a client/server infrastructure. Also, the computer may have another structure or may include similar elements. These elements may include, but is not limited to, cache memories temporarily storing the programs or parts thereof. Also, it is possible to replace the computer with one or more data processing entities, or with a combination thereof, including but not limited to a multi-tier architecture, a grid computing infrastructure, and the like.

A person skilled in the art may apply the embodiments of the invention described above with many logical and/or physical modifications and alterations. Although the present invention has been described with a certain degree of particularity with reference to certain embodiment(s), it should be understood that various omissions, substitutions and changes in the form and details as well as other embodiments are possible. Also, the embodiments of the invention may even be practiced without the specific details, including but not limited to the numerical examples, set forth in the preceding description to provide a more thorough understanding thereof. It is expressly intended that elements and/or method steps described in connection with any disclosed embodiment of the invention may be incorporated in any other embodiment as a matter of general design choice.

The invention claimed is:

1. A method for testing a software application comprising:
providing one or more test scenarios required to test the software application, wherein each test scenario is adapted to verify a feature of the software application;
assigning a weight to each test scenario, comprising:
assigning a relevance indicator to the test scenario, the relevance indicator representing a relevance of a feature being verified by the test scenario;
assigning a complexity indicator to the test scenario, the complexity indicator representing a complexity of the feature being verified by the test scenario; and
calculating the weight according to a combination of the relevance indicator and the complexity indicator;
determining a theoretical sequence of execution of the test scenarios according to the assigned weights; and
executing the test scenarios according to the theoretical sequence, comprising:
estimating the test scenarios expected to fail;
generating an expected sequence of execution of the test scenarios by adding a re-execution of each failing test scenario to the theoretical sequence;
calculating an expected trend of a cumulative weight of the test scenarios in the expected sequence;
measuring an actual trend of the cumulative weight of the executed test scenarios; and
tracking a progress of the testing according to a comparison between the actual trend and the expected trend.

2. The method of claim 1, wherein the estimation of the failing test scenarios comprises:
partitioning each sequence into one or more execution slots;
calculating an expected number of the failing test scenarios of each slot of the theoretical sequence according to an expected distribution of the failing test scenarios based on an expected stability of the software application; and selecting the expected number of failing test scenarios of each slot among the test scenarios included in the slot of the theoretical sequence.

3. The method of claim 1, further comprising assigning a cost indicator to each test scenario, the cost indicator representing a resource consumption being required to execute the test scenario, each trend plotting the cumulating weight as a function of a cumulative cost indicator of the test scenarios in the corresponding sequence,
   wherein the calculation of an expected trend comprises reducing the cost indicator for each execution of each failing test scenario according to a predefined reduction factor.

4. The method of claim 1, wherein tracking the progress of the testing further comprises:
   monitoring a variance indicator representing a difference between the actual trend and the expected trend; and
   executing a recovery action in response to the reaching of a threshold by the variance indicator.

5. The method of claim 1, wherein tracking the progress of the testing further comprises:
   monitoring a current percentage of a current value of the cumulative weight in the actual trend with respect to a final value of the cumulative weight in the expected trend; and
   triggering a further testing of the software application in response to the reaching of a further threshold by the current percentage.

\* \* \* \* \*